(No Model.) 2 Sheets—Sheet 1.
M. W. GRIFFITHS.
HARROW.
No. 270,055. Patented Jan. 2, 1883.
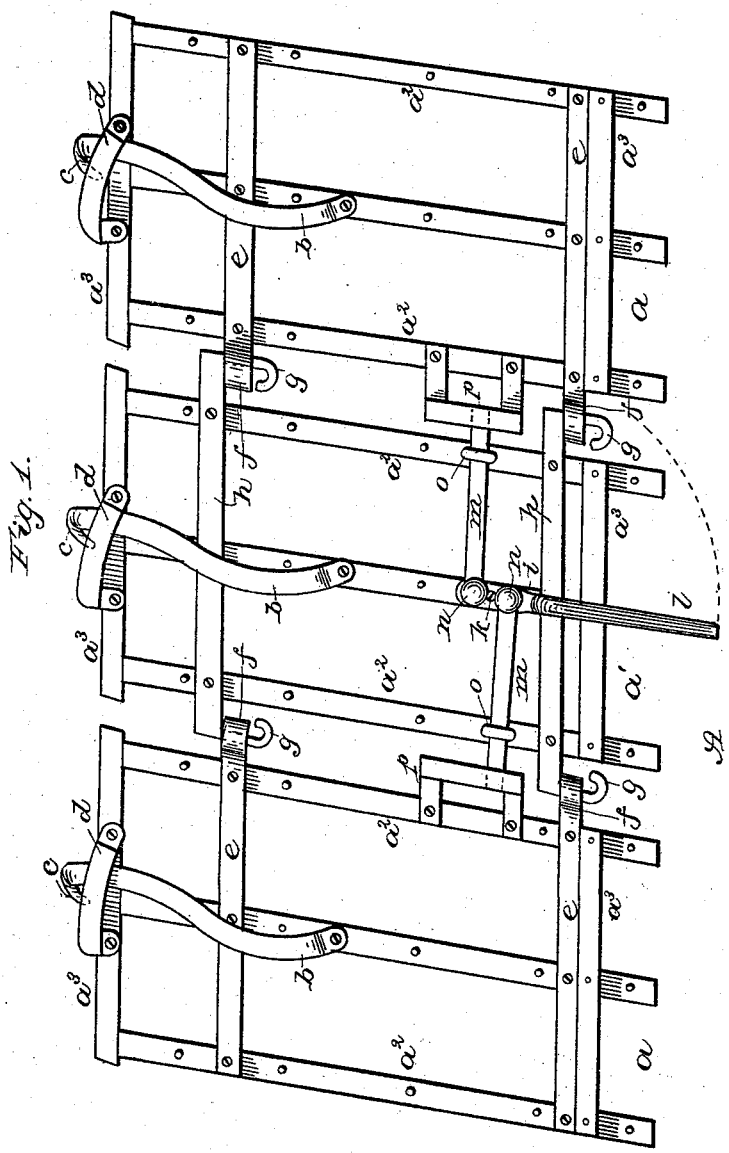

(No Model.) 2 Sheets—Sheet 2.
M. W. GRIFFITHS.
HARROW.
No. 270,055. Patented Jan. 2, 1883.
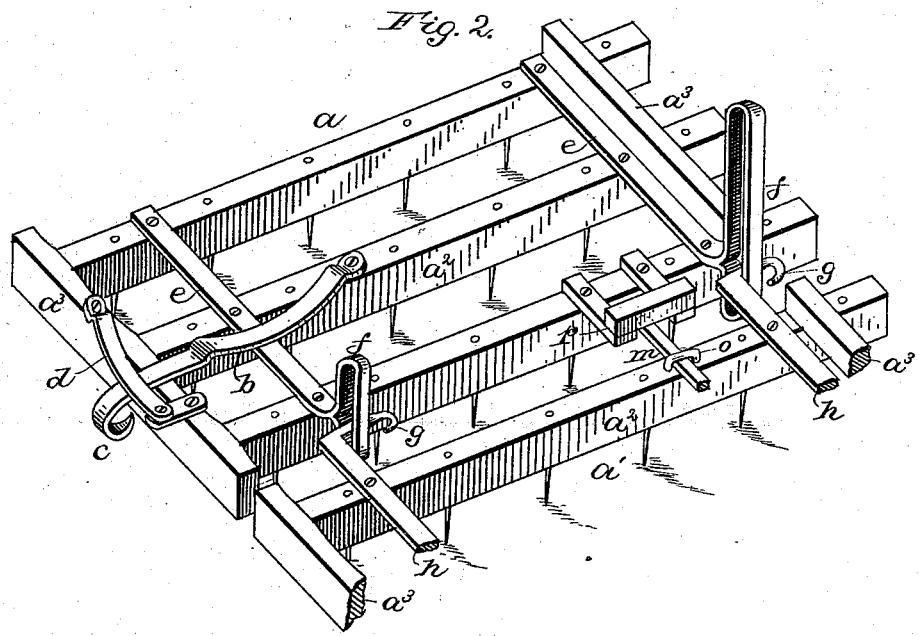
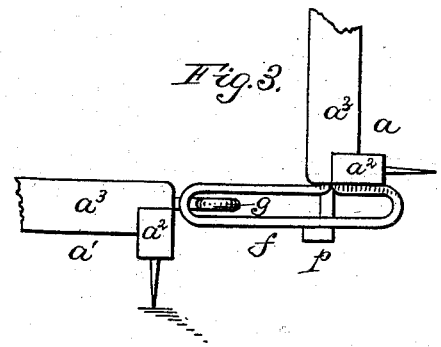
Witnesses:
J. W. Garner
U. S. D. Haines
Inventor:
Morris W. Griffiths.
per
Howard A. Snow
Atty.

UNITED STATES PATENT OFFICE.

MORRIS W. GRIFFITHS, OF MIDDLE GRANVILLE, NEW YORK.

HARROW.

SPECIFICATION forming part of Letters Patent No. 270,055, dated January 2, 1883.

Application filed September 1, 1882. (No model.)

*To all whom it may concern:*

Be it known that I, MORRIS W. GRIFFITHS, a citizen of the United States, residing at Middle Granville, in the county of Washington and State of New York, have invented certain new and useful Improvements in Harrows, of which the following is a specification, reference being had therein to the accompanying drawings.

My invention relates to an improvement in section-locking devices for harrows; and it consists in the construction and arrangement of its several parts, as will be hereinafter fully set forth, and pointed out in the claims.

In the accompanying drawings, Figure 1 is a top plan view of my harrow; Fig. 2, a perspective view of one of the outer sections and a portion of the inner one, illustrating the connecting devices. Fig. 3 is a detailed view.

A represents a harrow composed of the two outer sections, a a, and the middle section, a'. These sections are composed of the longitudinal parallel bars $a^2$ and the transverse beams $a^3$, securing them together at their ends and secured to them at a suitable angle other than a right angle, as shown at Fig. 1. Pivoted to the central bar, $a^2$, of each of the sections, at a suitable distance from the front thereof, is a draw-bar, b, which extends forward a suitable distance beyond the harrow-section and terminates in a hook, c, adapted to receive a link or bail from the whiffletree. The lateral movement of the front ends of these draw-bars is controlled by the bearing guide-plates d, secured to the front cross-beams, $a^3$. By means of these laterally-adjustable draw-bars the angle at which the harrow is drawn can be altered to suit the requirements of the case, as will be readily understood. To accomplish this a series of holes (not shown) can be punched through the guide-plates d, and single holes can be punched through the draw-bars, so they can be moved under any one hole of the series in the guide-plates and secured by a pin running through both. It will be plainly seen that by pivoting the draw-bar either one side or the other from the line of the center beam the angle of draft will cause the rear end of the harrow to swing toward the side to which the draw-bar is pivoted. Secured transversely to the outer sections, a, are the metallic bars e, which terminate in the long vertical loops f on the inner sides of the sections, into which loops f catch the hooks g, formed on the ends of the bars h, which are secured transversely to the central section, a'. These hooks can only be disengaged from the loops g by turning the sections having the loops secured to them at right angles to the central section which bears the hooks, as shown at Fig. 3. Consequently the sections cannot become disconnected by accident when in use in the field. The long loops give sufficient vertical play to the sections to allow them to jump over inequalities in the ground, stumps, stones, &c., independently of one another. In order to give rigidity to the harrow when using it on level ground, I provide the central section with the lever i, pivoted at k, and provided with the projecting handle l, to which I pivot the bolts m at the point n a suitable distance from the fulcrum. These bolts extend out past the opposite sides of the central section, are secured in position by the guides o, and take into the keepers p, with which the outer sections are provided on their inner sides. When the lever i is in the position shown in Fig. 1 the sections are secured rigidly together; but when the lever is swung round, as indicated by the curved dotted line, the outer ends of the bolts m become disengaged from the keepers p, and the sections are only secured together by the hooks and loops, as previously described.

A harrow thus constructed is simple, strong, and durable, and is admirably adapted to all kinds of work.

Having thus described my invention, I claim—

The harrow sections a a', secured together by means of the vertical loops f and hooks g, in combination with the locking device consisting of the pivoted lever i, bolts m, and keepers p, whereby the sections of the harrow are allowed independent vertical movements on uneven ground or secured rigidly together when working in level ground, substantially as shown and described.

In testimony whereof I affix my signature in presence of two witnesses.

MORRIS W. GRIFFITHS.

Witnesses:
WILLIAM LYONS,
GEO. E. PAUL, M. D.